(12) United States Patent
Wiseman et al.

(10) Patent No.: US 8,776,431 B1
(45) Date of Patent: Jul. 15, 2014

(54) PLANTER WITH ADJUSTABLE LEGS

(76) Inventors: Danny R. Wiseman, Shady Spring, WV (US); Tresa Wiseman, Shady Spring, WV (US)

( * ) Notice: Subject to any disclaimer, the term of this patent is extended or adjusted under 35 U.S.C. 154(b) by 639 days.

(21) Appl. No.: 13/156,391

(22) Filed: Jun. 9, 2011

(51) Int. Cl.
*A47G 7/00* (2006.01)
*A01G 9/02* (2006.01)
*A47G 7/02* (2006.01)

(52) U.S. Cl.
CPC .................................. *A47G 7/02* (2013.01)
USPC .................................. 47/39; 47/83

(58) Field of Classification Search
CPC .............. A47G 7/00; A47G 7/02; A01G 9/02
USPC ................................. 47/39, 67, 83
See application file for complete search history.

(56) References Cited

U.S. PATENT DOCUMENTS

| 911,149 | A | * | 2/1909 | Moore | 108/148 |
| 2,941,502 | A | * | 6/1960 | Pusey | 119/69.5 |
| 3,084,666 | A | * | 4/1963 | Plaisance | 119/69.5 |
| 5,577,344 | A | * | 11/1996 | Zaremba et al. | 47/39 |
| 6,094,861 | A | | 8/2000 | Sandman et al. | |
| 6,155,529 | A | | 12/2000 | De Carlo | |
| 6,345,466 | B1 | * | 2/2002 | Venanzi | 47/66.1 |
| 6,874,278 | B2 | | 4/2005 | Felknor et al. | |
| 2008/0083162 | A1 | * | 4/2008 | Vandyken | 47/39 |

* cited by examiner

*Primary Examiner* — Monica Williams
(74) *Attorney, Agent, or Firm* — Montgomery Patent and Design; Robert C. Montgomery

(57) ABSTRACT

A planter with adjustable legs particularly adapted to growing plants such as flowers and vegetables, comprises a planter basin, three adjustable legs, and a plurality of basin apertures and corresponding plant support plates. The planter comprises a generally rectangular shape with side walls and a center opening. The basin apertures and slotted support plates provide a means to grow plants in an inverted manner. The legs are telescopingly adjustable which allows use of the planter on an uneven ground surface as well as allowing the user to raise the planter as necessary while growing the inverted plants.

20 Claims, 5 Drawing Sheets

PLANTER WITH ADJUSTABLE LEGS

RELATED APPLICATIONS

The present invention was first described in a notarized Official Record of Invention on Jun. 25, 2010, that is on file at the offices of Montgomery Patent and Design, LLC, the entire disclosures of which are incorporated herein by reference.

FIELD OF THE INVENTION

The present invention relates generally to gardening devices, and in particular, to planter having a level growing basin supported above a ground surface by three (3) adjustable legs for growing plants in an inverted orientation and an upright orientation.

BACKGROUND OF THE INVENTION

Potted plants and flowers are a welcome addition to almost any home exterior area such as porches or patios. Their vibrant colors combined with their unique living appearance brighten the exterior of any home and make it a more inviting experience. Many people resort to the use of planters for holding such flowering plants and even vegetables. However, such planters require a level surface upon which to be placed. Any uneven ground surface such as grass, gravel, or the like will cause such planters to tip over in even the slightest of breezes.

Additionally, many households are rediscovering the benefits of having a home garden. In many urban environments there is limited room for growing flowers, herbs, and vegetables. This lack of space becomes an even greater disadvantage when trying to glow fruiting vegetables like tomatoes, cucumbers, or similar vegetable which require growth control measures such as staking.

There have been various attempts to provide growing containers which address these problems. Examples of these attempts range from window box gardens suspended growing containers which provide for such vegetable to be planted in an inverted position such that they grow in a downward direction from the suspended growing device. Examples of these devices can be seen by reference in U.S. Pat. No. 6,094,861 issued to Sandman et al. and U.S. Pat. No. 6,874,278 issued to Felknor et al.

While these concepts are sound and these devices may achieve their purported objectives each suffer from one (1) or more disadvantage or deficiency related to design or utilization. Particularly, these devices are useful for only one (1) plant per container. Furthermore, the design of these types of growing devices makes it almost impossible to use the growing container for additional flowers or vegetables. These devices also require a suitable support structure to hang the growing device which can support the weight of the plant and the soil.

SUMMARY OF THE INVENTION

The inventor has therefore recognized the aforementioned inherent problems and lack in the art and observed that there is a need for a growing apparatus in which outdoor planters can be provided the ability to adapt to uneven ground surfaces in a manner which addresses the concerns as outlined above. Additionally, there is a need for an apparatus which allows a user to grow a variety of flowers, vegetable plants, and herbs in a single, convenient location that allows for growth in an upright position and in an inverted position. In accordance with the invention, it is an object of the present disclosure to solve these problems.

The inventor recognized these problems and has addressed this need by developing a planter apparatus with adjustable legs that allows for easy growing of outdoor plants in a manner which is quick, easy, and effective and aesthetically pleasing. The inventor has thus realized the advantages and benefits of providing the planter apparatus having a growing basin with a closed bottom, sidewalls, and an open top. An opening is disposed through a center of the basin bottom and a walled structure extends upwardly from a perimeter edge of the opening parallel to the basin sidewalls and defining an inner cavity therebetween to hold potting soil. Three (3) legs coupled to an exterior of the basin bottom to ensure that the basin will maintain a level orientation irrespective of the unevenness of the ground surface. At least one (1) basin aperture is disposed through the basin bottom to receive a root portion of an inverted plant. At least one (1) plant support plate having an outer perimeter larger than the basin aperture is provided to cover the basin aperture. Each plant support plate has a slot extending from a center to the outer perimeter to receive a lower stem of the inverted plant such that the root portion is disposed within the inner cavity and is surrounded by soil. The inverted plant root portion is positioned within the soil for growing the inverted plant downwardly from the basin.

In addition, each leg includes at least two (2) sections adapted to be adjustable in length by moving one section relative to another section and securing to an adjusted length. At least one (1) locking mechanism is provided between the leg sections to secure them in relation to each other at the adjusted length, such that each leg can be adjusted to a suitable and independent length to maintain the basin at the level orientation. Three (3) leg mounts are affixed to the basin bottom exterior surface, each having cylindrical protrusion extending from the basin bottom exterior surface generally angularly away from the basin bottom and from each other which are inserted into a top end of leg. This creates a generally triangular and stable support base for the growing basin.

In an embodiment of the invention, the growing basin does not have the center opening and the walled structure divides the basin into multiple growing compartments. A basin aperture is disposed at a generally central position within each of the growing compartments. This allows the growing basin to support plants in the upright growing position and the inverted growing position.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

Figure 1:
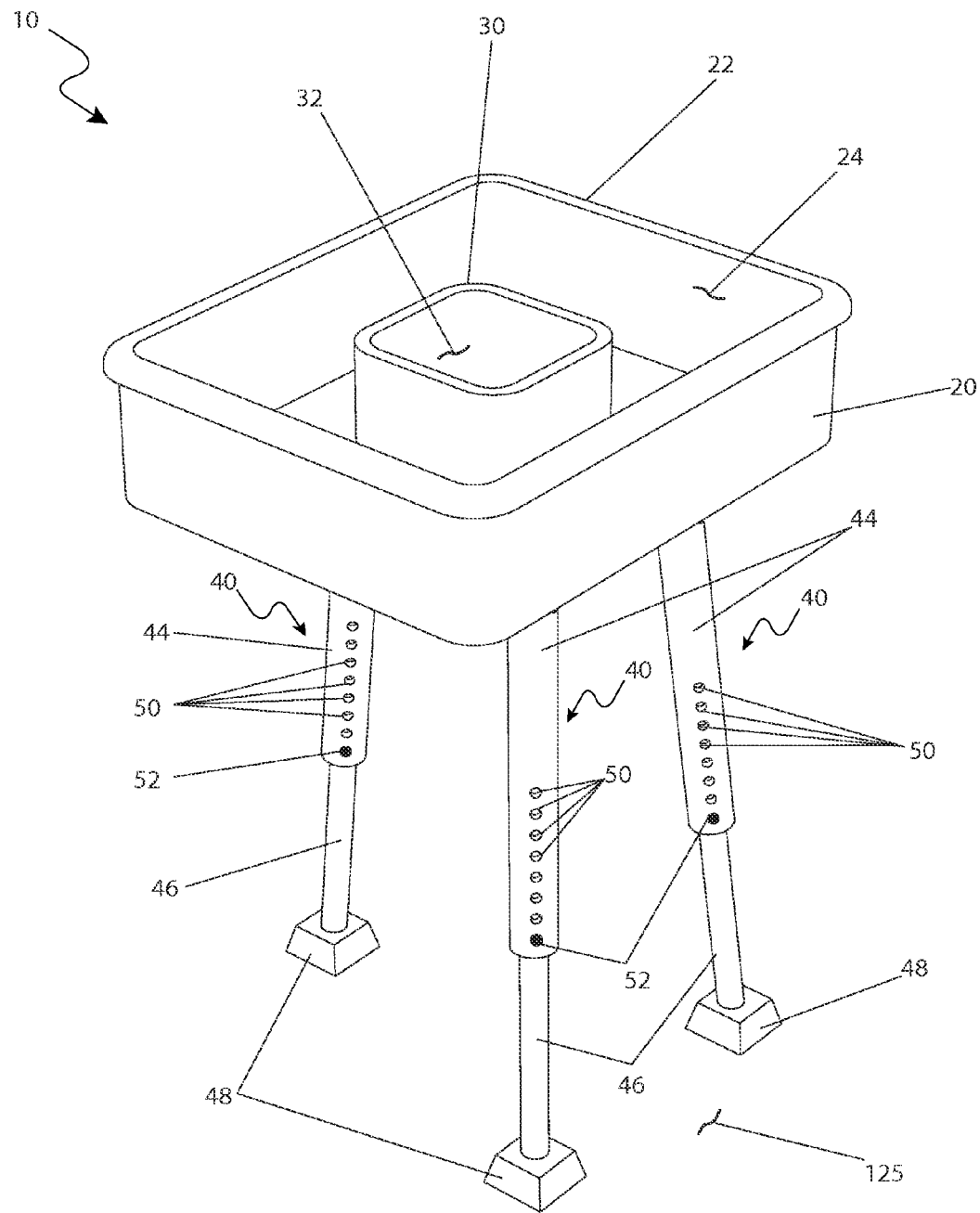
FIG. 1 is a downward perspective view of a modular planter with adjustable legs, according to a preferred embodiment in accordance with the invention.

| Descriptive Key | |
|---|---|
| 10 | planter apparatus |
| 20 | planter basin |
| 22 | rim |
| 24 | basin inner cavity |
| 26 | drain hole |
| 30 | interior structure |
| 32 | center opening |
| 34 | basin aperture |
| 36 | plant support plate |
| 38 | slot |
| 40 | adjustable leg assembly |
| 42 | leg mount |
| 44 | upper leg member |
| 46 | lower leg member |
| 48 | foot |
| 50 | leg aperture |
| 52 | spring pin device |
| 100 | fastener |
| 110 | upper plant |
| 115 | inverted plant |
| 116 | plant root |
| 120 | potting soil |
| 125 | ground surface |

DETAILED DESCRIPTION OF THE PREFERRED EMBODIMENT

In accordance with the invention, the best mode is presented in terms of a preferred embodiment, herein depicted within FIGS. 1 through 5. However, the disclosure is not limited to a single described embodiment and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one particular configuration may be shown and described for purposes of clarity and disclosure and not by way of limitation of scope.

The terms "a" and "an" herein do not denote a limitation of quantity, but rather denote the presence of at least one of the referenced items.

Referring now to FIGS. 1 through 5, depicting a planter apparatus with adjustable legs (herein described as an "apparatus") 10, where like reference numerals represent similar or like parts. In accordance with the invention, the present disclosure describes a modular apparatus which provides a growing structure for indoor and outdoor plants with adjustable legs to accommodate uneven ground surfaces when utilized outdoors.

FIG. 1 shows a downward perspective view of the apparatus 10. The apparatus 10 has a generally rectangular-shaped planter basin 20 with approximate dimensions of twenty-four (24) inches in width, twenty-four (24) inches in length, and outer walls approximately six (6) inches in height. The basin 20 includes a flat bottom with the walls having rounded corners. An attractive rolled rim 22 extends along an entire upper perimeter edge of the walls. The basin 20 also includes a centrally-located decorative rectangular opening 32 which extends entirely through the flat bottom floor of the basin 20. A box-like interior structure 30 having four (4) interior walls is integrally-molded to the basin floor and protrudes upwardly from the center opening 32 to a height slightly below that of the perimeter exterior walls of the basin 20.

The basin 20 forms an inner cavity 24 between the exterior walls of the basin 20 and the interior walls of the interior structure 30. The inner cavity 24 is approximately six (6) inches wide and six (6) inches deep and extends along the four (4) perimeter sides. The inner cavity 24 provides a suitable vessel for planting various plants 110 (see FIG. 3). It can be appreciated that the apparatus 10 is not limited to the single embodiment illustrated here and can be introduced having a variety of different length, width, and depth dimensions based upon particular plant growing projects as well as a user's preference and as such should not be interpreted as a limiting factor of the apparatus 10.

The apparatus 10 is preferably made using rugged plastic materials having a green pigmentation and being manufactured in a plastic molding process. However, it can also be appreciated that other colored plastic materials as well as other materials such as stainless-steel can be used to fabricate the apparatus 10 while providing equal benefit and as such should not be interpreted as a limiting factor of the apparatus 10.

The apparatus 10 also has three (3) adjustable leg assemblies 40 which provide a triangular support structure which allows the user to position the apparatus 10 upon an uneven floor or ground surface 125. Each leg assembly 40 includes two (2) elongated sections which are telescopingly attached to one another and secured at a desired length by a plurality of leg apertures 50 and respective spring-pins 52. The length adjustment mechanism provides for independent adjustment of the overall length of each leg assembly 40. The leg assemblies 40 are preferably made of PVC piping.

Figure 2:
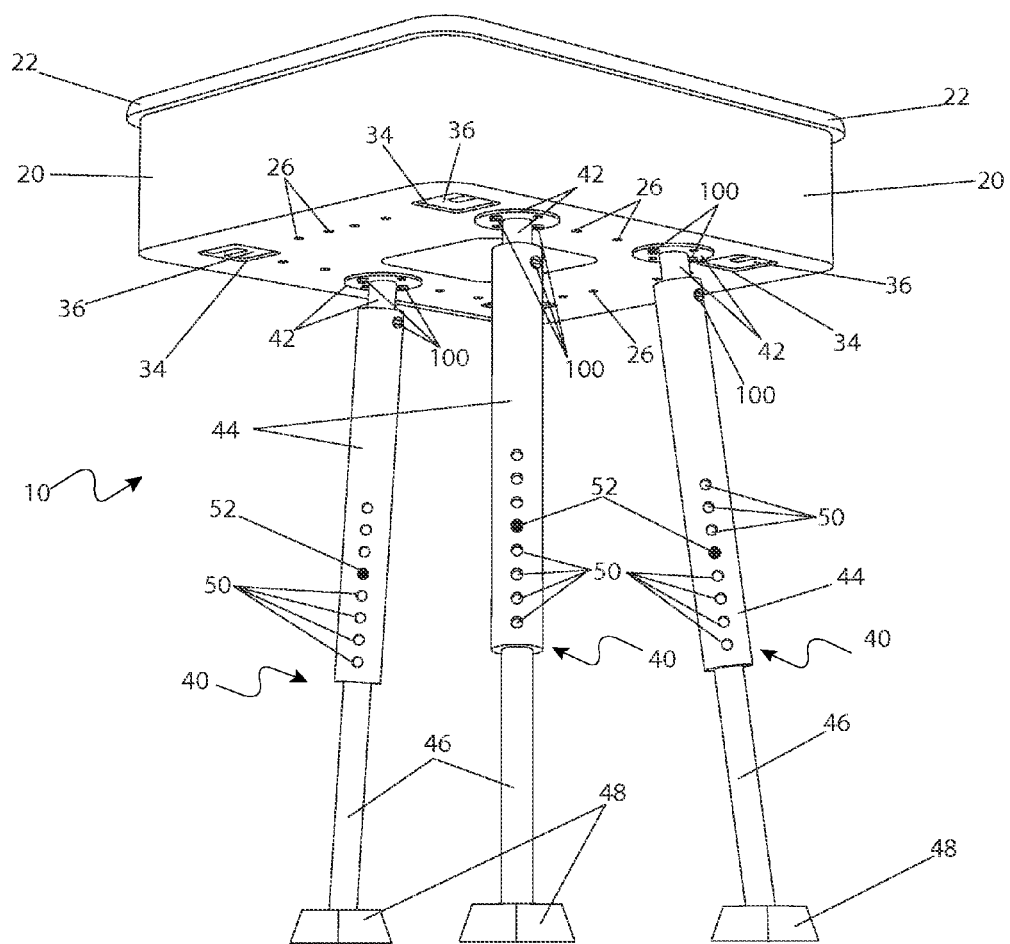
FIG. 2 is an upward perspective view of the modular planter with adjustable legs, according to the preferred embodiment.

FIG. 2 shows an upward perspective view of the apparatus 10. The three (3) adjustable leg assemblies 40 allow the user to position the apparatus 10 upon an uneven floor or ground surface 125 in a safe and stable manner. Two (2) leg assemblies 40 are mounted along one (1) edge of the basin 20 adjacent to a pair of basin apertures 34 (see FIGS. 4 and 5). The third leg assembly 40 is mounted at a generally central location along an opposing side edge of the basin 20. The adjustable leg assemblies 40 extend downwardly and outwardly from the basin 20 at approximately a ten degree (10°) angle from vertical, thereby providing a stable triangular stance upon the floor or ground surface 125.

Each leg assembly 40 has a leg mount 42, an upper leg member 44, a lower leg member 46, and a rubber foot 48. The leg mounts 42 provide removable attachment of the leg assembly 40 to a bottom surface of the basin 20. Each leg mount 42 is a plastic molded adapter having a circular flanged fitting affixed to the bottom surface of the basin 20 using a plurality of fasteners 100 such as rivets, screws, or the like. The leg mount 42 also includes a cylindrical protrusion which extends perpendicularly downward at approximately a ten degree (10°) angle from vertical and is sized to insertingly fit into an open upper end of the tubular upper leg member 44. Once inserted, the leg mount 42 is secured to the upper leg member 44 using an additional fastener 100, thereby allowing the apparatus 10 to be easily disassembled for compact storage.

The upper leg member 44 and lower leg member 46 are made from two (2) sections of PVC piping having progressively smaller-sized diameters, thus allowing the lower leg member 46 to be insertingly coupled to the upper leg member 44. The upper leg member 44 and lower leg member 46 are secured at a desired combined length by a length adjustment mechanism, which is preferably a plurality of leg apertures 50 arranged in a linear fashion along the upper leg member 44 and a respective detent spring-pin 52 disposed on the lower leg member 46 which insertingly engages a selected one of the leg apertures 50. The spring-pin device 52 is preferably a spring-and-button device, similar to those typically used to secure awnings, tent poles, and the like. The spring-pin device 52 works in conjunction with the leg apertures 50 to adjust the downwardly extended lower leg member 46 at increments of approximately one-half (½) inch. In such a manner the overall length of each leg assembly 40 can be adjusted to suit inconsistencies in the local ground surface 125 while keeping the basin 20 level.

A soft rubber foot 48 is attached to a bottom end of each lower leg member 46 and is capable of compliant deformation to conform to an uneven ground surface. The feet 48 provide additional stability to the apparatus 10 and form a generally rectangular body with a flat-bottom. The feet 48 are permanently affixed to respective bottom ends of each lower leg member 46, preferably using an industrial adhesive.

Figure 3:
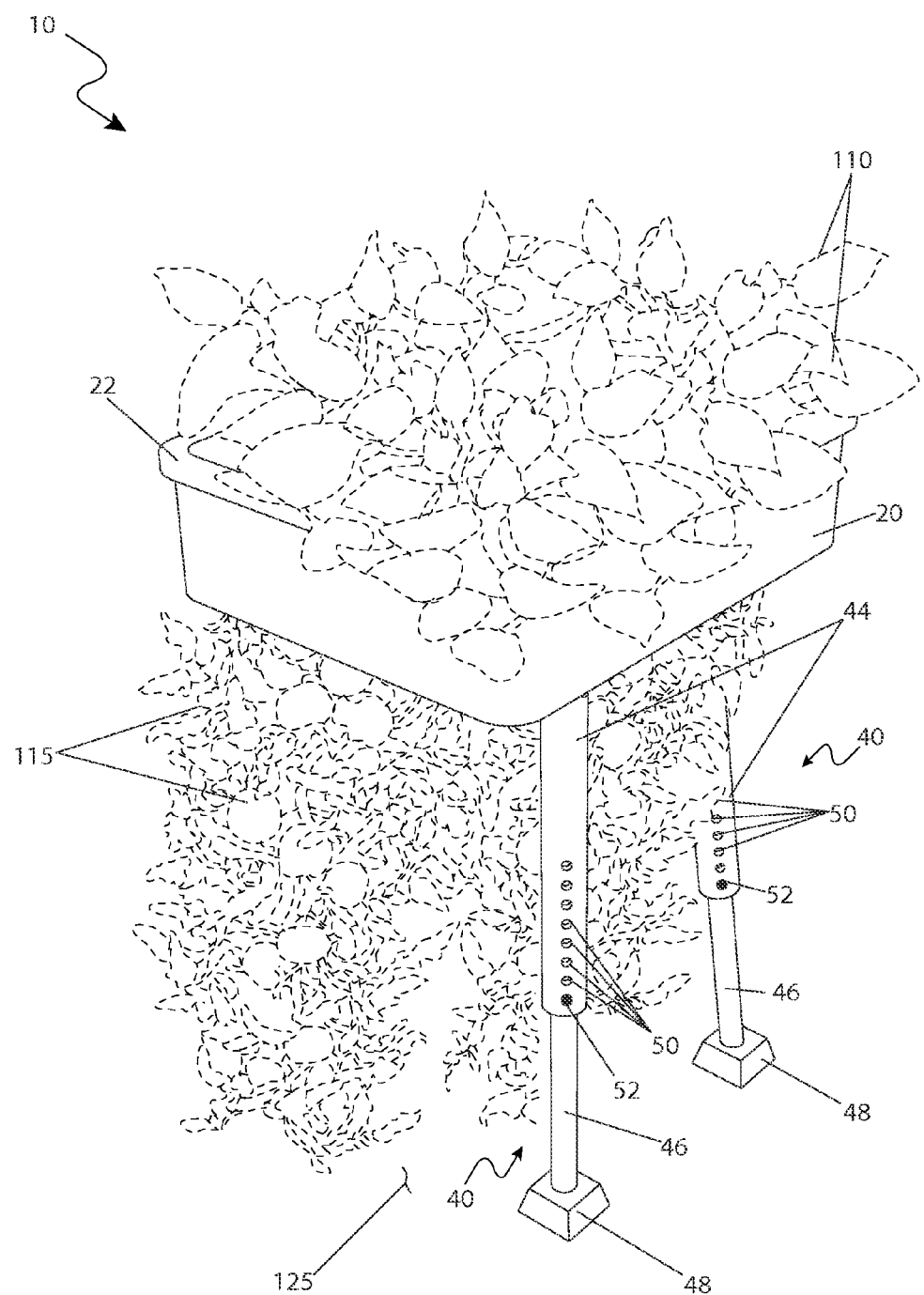
FIG. 3 is an environmental view of the modular planter with adjustable legs, according to the preferred embodiment.
Figure 4:
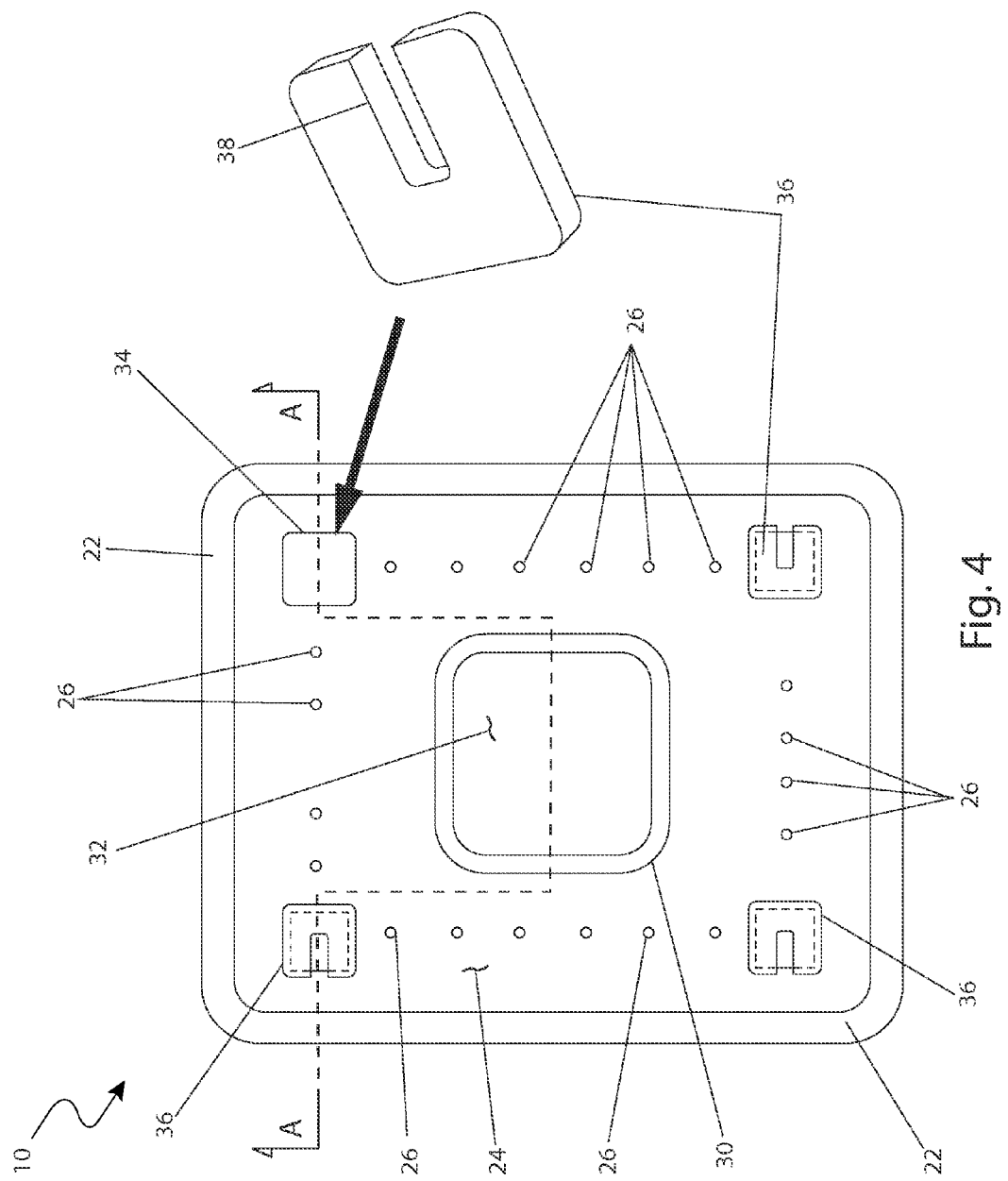
FIG. 4 is a top view of the modular planter with adjustable legs, according to the preferred embodiment; and, FIG. 5 is a section view of the modular planter with adjustable legs taken along section line A-A of FIG. 4, according to the preferred embodiment.
Figure 5:
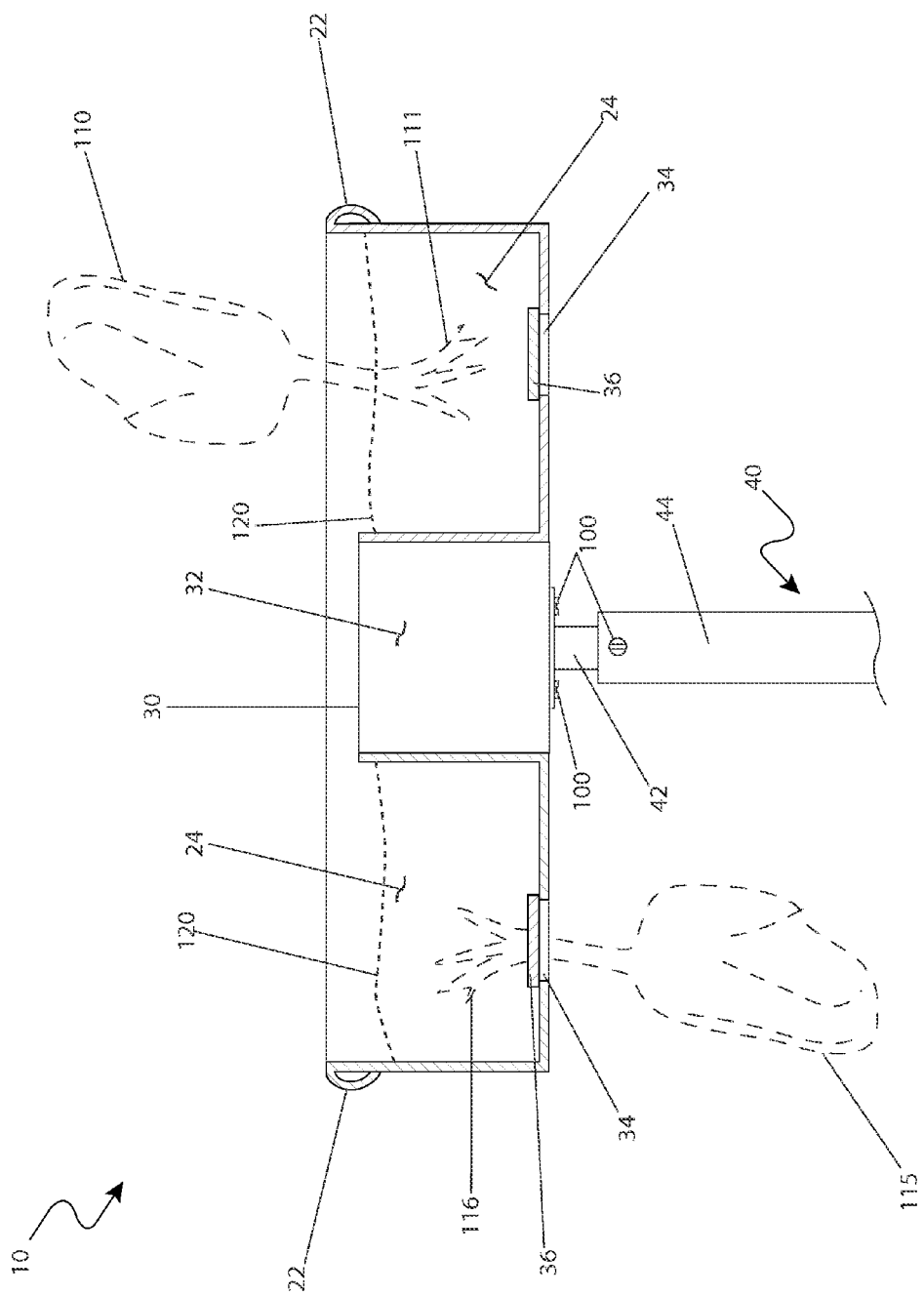

The basin 20 further comprises four (4) rectangular basin apertures 34 and four (4) corresponding plant support plates 36 which support the growth of plants 115 in an inverted orientation (see FIGS. 3, 4, and 5).

FIG. 3 shows an environmental view of the apparatus 10. The apparatus 10 is intended to be used to grow vegetables, flowers, and other plants 110, 115 using a volume of potting soil 120 placed within the basin inner cavity 24. The apparatus 10 provides for growth of upper plants 110 being orientated in a conventional upwardly growing manner within the basin inner cavity 24 as well as up to four (4) inverted plants 115 via four (4) basin apertures 34 and corresponding plant support plates 36 (see FIGS. 4 and 5).

Upon conclusion of a growing season, the apparatus 10 can be emptied, washed, and stored until needed again. The use of the apparatus 10 allows for easy growing of indoor or outdoor plants 110, 115 in a manner which is quick, effective, and aesthetically pleasant.

FIGS. 4 and 5 show a top view and a section view of the basin 20 of the apparatus 10. The basin 20 provides for the support and growth of inverted plants 115 using the four (4) rectangular basin apertures 34 and the corresponding plant support plates 36. The basin apertures 34 comprise rectangular openings through a bottom floor of the basin 20 positioned at corner locations and preferably being approximately two (2) to three (3) inches square in shape. Each basin aperture 34 is covered by the corresponding superjacent plant support plate 36 which comprises a rectangular plastic plate having slightly greater length and width dimensions than the basin aperture 34 so as to rest securely upon the basin aperture 34. The plant support plate 36 comprises an open-ended slot 38 approximately one-half (½) inch in width and extending approximately half way across the plant support plate 36. In use, the plant root 116 of the inverted plant 115 is inserted upwardly through a basin aperture 34 and subsequently into the slot portion 38 of the plant support plate 36, thereby enabling hanging of the inverted plant 115 below the basin 20 while minimizing a loss of potting soil 120 during planting.

The basin 20 further comprises a plurality of equally-spaced liquid drain holes 26 arranged in a linear pattern along a bottom surface of the basin inner cavity 24. The drain holes 26 are apertures small enough to allow for proper drainage of water without loss of the potting soil 120.

It is envisioned that other styles and configurations can be easily incorporated into the teachings of the present disclosure and only one particular configuration has been shown and described for purposes of clarity and disclosure and not by way of limitation of scope.

In accordance with the invention, the preferred embodiment can be utilized by the user in a simple and effortless manner with little or no training. After initial purchase or acquisition of the apparatus 10, it is installed and utilized as indicated in FIGS. 1 and 3.

The method of installing and utilizing the apparatus 10 can be achieved by performing the following steps: procuring a desired model of the apparatus 10 having desired length, width, and depth dimensions and having a desired external color or pattern; assembling the three (3) adjustable leg assemblies 40 to the basin 20, if not previously assembled, by fastening the three (3) leg mounts 42 to the bottom surface of the basin 20 using the provided fasteners 100; giving care that the leg mounts 42 are oriented properly, being directed outwardly from a center of the apparatus 10; fastening the upper leg members 44 to each corresponding leg mount 42 using additional fasteners 100; mounting a lower leg member 46 to a respective upper leg member 44 by manually depressing the spring-pin device 52 of the lower leg member 46 and inserting the lower leg member 46 into the respective upper leg member 44; continuing to insert the lower leg member 46 into the upper leg member 44 until obtaining a desired combined length; allowing the spring-pin device 52 to engage an adjacent leg aperture 50 to secure a length of the adjustable leg assembly 40; and, installing the remaining two (2) lower leg members 46 in like manner, to obtain a level orientation of the basin 20 upon level or uneven ground surfaces 125. The apparatus 10 is now ready to receive potting soil 120 and plants 110, 115.

The method of installing upper 110 and inverted 115 plants into the apparatus 10 can be achieved by performing the following steps: installing up to four (4) inverted plants 115 by upwardly inserting each plant root 116 through a respective basin aperture 34; inserting the plant root 116 into the slot 38 of the plant support plate 36; resting the plant support plate 36 onto the basin aperture 34, thereby suspending the inverted plant 115; filling the basin inner cavity 24 with a suitable volume of potting soil 120, thereby covering the plant roots 116 of the inverted plants 115; planting a desired number of upper plants 110 in the potting soil 120 in a conventional manner; caring for the plants 110, 115 in a normal manner by applying water, fertilizers, and the like to promote healthy plant growth; emptying the apparatus 10 of plants 110, 115 and soil 120 at an end of a growing season; rinsing or cleaning the apparatus 10; disassembling leg assemblies 40, as desired, to store the apparatus 10 until a subsequent growing season; and, benefiting from continued annual indoor or outdoor plant growing using the apparatus 10 in a manner which is quick, effective, and aesthetically pleasant.

The foregoing descriptions of specific embodiments have been presented for purposes of illustration and description. They are not intended to be exhaustive or to limit the invention and method of use to the precise forms disclosed. Various modifications and variations can be appreciated by one skilled in the art in light of the above teachings. The embodiments have been chosen and described in order to best explain the principles and practical application in accordance with the invention to enable those skilled in the art to best utilize the various embodiments with expected modifications as are suited to the particular use contemplated. It is understood that various omissions or substitutions of equivalents are contemplated as circumstance may suggest or render expedient, but is intended to cover the application or implementation without departing from the spirit or scope of the claims of the invention.

What is claimed is:

1. A planter apparatus comprising:
   a basin having a closed bottom, sidewalls, and an open top;
   an opening disposed through a center of said basin bottom;
   a walled structure extending upwardly from a perimeter edge of said opening being parallel to said basin sidewalls and defining an inner cavity therebetween;
   three legs coupled to an exterior of said basin bottom;
   at least one basin aperture disposed through said basin bottom to receive a root portion of an inverted plant; and,
   at least one plant support plate having an outer perimeter larger than said basin aperture to cover the same and a slot extending from a center to said outer perimeter to receive a lower stem of said inverted plant such that said root portion is disposed within said inner cavity;
   wherein soil is disposed within said inner cavity; and,
   wherein said inverted plant root portion is positioned within said soil for growing said inverted plant downwardly from said basin.

2. The apparatus of claim 1, wherein each of said legs further comprises an upper leg member and a lower leg member; wherein said lower leg member comprises a diameter smaller than said upper leg member such that said lower leg member is adapted to slide within said upper leg member so that said leg is adjustable in length by sliding said lower leg member within said upper leg member.

3. The apparatus of claim 2, wherein each of said legs further comprises a locking mechanism to secure said lower leg member in relation to said upper leg member at an adjusted length.

4. The apparatus of claim 3, wherein each of said lower leg members further comprises a foot affixed to an end thereof opposite said upper leg member.

5. The apparatus of claim 4, wherein said locking mechanism further comprises:
   a plurality of leg apertures disposed longitudinally along said upper leg member; and,
   a spring detent device adapted to fit within a prescribed one of said plurality of leg apertures to secure said lower leg member in relation to said upper leg member at said adjusted length.

6. The apparatus of claim 5, further comprising three leg mounts affixed to said basin bottom exterior surface for attachment of said legs.

7. The apparatus of claim 6, wherein each of said leg mounts comprises a flanged periphery fastened to said basin bottom exterior surface and a cylindrical protrusion extending from said basin bottom exterior surface generally angularly away from said basin bottom and from one another to be inserted into a top end of said upper leg member.

8. The apparatus of claim 7, wherein said basin further comprises a plurality of drain apertures disposed through said basin bottom.

9. The apparatus of claim 8, wherein a root portion of an upright plant is disposed within said soil for growing said upright plant in an upwardly direction from said basin.

10. The apparatus of claim 9, wherein said basin further comprises a generally rectangular body having four basin apertures disposed adjacent to each corner region.

11. The apparatus of claim 10, wherein said basin further comprises a rolled rim around the perimeter of said open top.

12. The apparatus of claim 1, wherein each of said legs further comprises:
   at least two sections adapted to be adjustable in length by moving one section relative to another section and securing to an adjusted length;
   at least one locking mechanism to secure said at least two sections in relation to one another at said adjusted length; and,
   a leg mount affixed to said basin bottom exterior surface having a cylindrical protrusion extending from said basin bottom exterior surface generally angularly away from said basin bottom and from one another to be inserted into a top end of said leg.

13. A planter apparatus comprising:
   a basin having a closed bottom, sidewalls, and an open top;
   a dividing structure having at least one wall extending upwardly from an interior surface of said basin bottom being parallel to said basin sidewalls and defining at least one inner cavity therebetween;
   three legs coupled to an exterior of said basin bottom;
   at least one basin aperture disposed through said basin bottom within said inner cavity to receive a root portion of an inverted plant; and,
   at least one plant support plate having an outer perimeter larger than said basin aperture to cover the same and a slot extending from a center to said outer perimeter to receive a lower stem of said inverted plant such that said root portion is disposed within said at least one inner cavity;
   wherein soil is disposed within said at least one inner cavity; and,
   wherein said inverted plant root portion is positioned within said soil for growing said inverted plant downwardly from said basin.

14. The apparatus of claim 13, wherein each of said legs further comprises at least two sections; wherein each of said two sections comprises a varying diameter such that one section is adapted to slide within another section so that said at least two sections are adjustable in length by sliding said one section within said another section.

15. The apparatus of claim 14, wherein said legs are attached to and extend from said basin bottom exterior surface generally angularly away from said basin bottom and from one another for supporting said basin.

16. The apparatus of claim 15, wherein each of said legs further comprises at least one locking mechanism to secure said at least two sections in relation to one another at an adjusted length.

17. The apparatus of claim 16, wherein each of said lower leg members further comprises a foot affixed to an end thereof opposite said upper leg member.

18. The apparatus of claim 17, wherein said basin further comprises a plurality of drain apertures disposed through said basin bottom.

19. The apparatus of claim 18, wherein a root portion of an upright plant is disposed within said soil for growing said upright plant in an upwardly direction from said basin.

20. The apparatus of claim 19, wherein said locking mechanism further comprises a detent pin mechanism.

* * * * *